Nov. 4, 1952     C. A. PICKENS ET AL     2,616,294
FILTERING LIQUID LEVEL GAUGE

Filed Dec. 2, 1948

Claude A. Pickens
William D. Pickens
Inventor

By Glenn L. Fish
Attorney

Patented Nov. 4, 1952

2,616,294

UNITED STATES PATENT OFFICE 2,616,294

FILTERING LIQUID LEVEL GAUGE

Claude A. Pickens and William D. Pickens, Spokane, Wash.; said William D. Pickens assignor to said Claude A. Pickens Application December 2, 1948, Serial No. 63,022

1 Claim. (Cl. 73—323)

Our present invention relates to an improved filtering fluid level guage of the type especially adapted for use with one or more barrels or drums and so constructed as to be easily attached to the barrels or drums to indicate the supply therein.

In the accompanying drawings we have illustrated one complete example of the physical embodiment of our invention according to the best mode we have thus far devised but it will be understood that various changes and alterations may be made in the exemplified structure within the scope of the appended claim.

Figure 1:
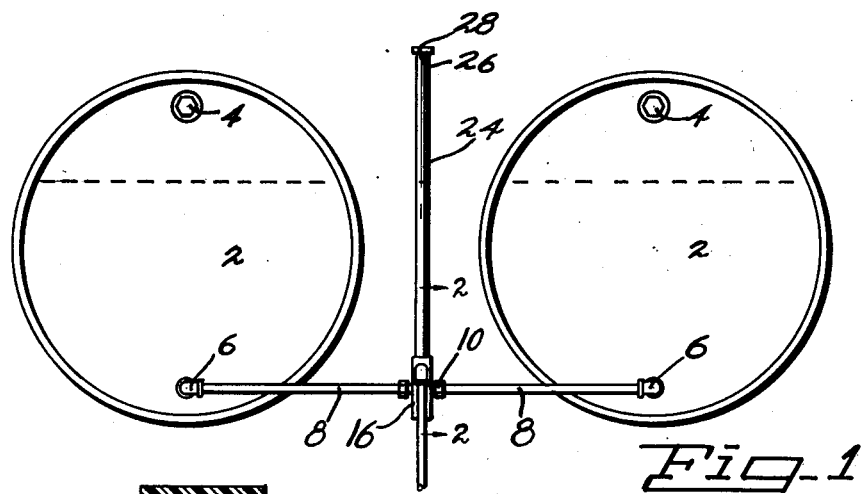
Figure 1 is a front elevational view of the gauge of our invention attached to a pair of drums.
Figure 2:
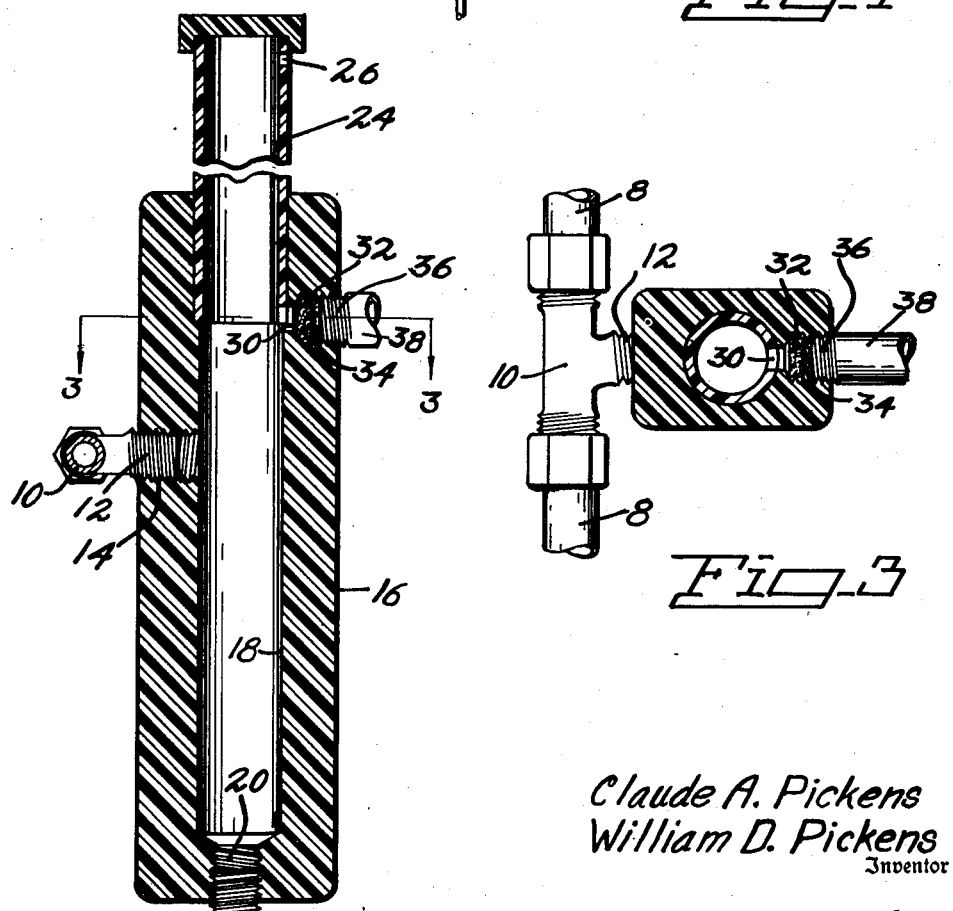
Figure 2 is a vertical sectional view taken at line 2—2 of Figure 1.
Figure 3:
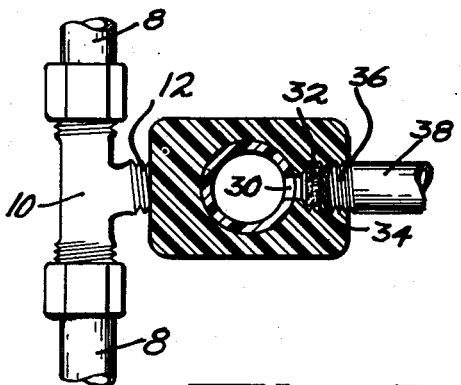
Figure 3 is a horizontal sectional view taken at line 3—3 of Figure 2.

Referring now to the drawings we have illustrated our invention as used with two drums 2 of the conventional type often employed to store and feed light fuel oil. These drums have filling plugs 4 of the usual type and elbows 6 are secured to the usual nipples, not shown.

Pipes 8 lead to and connect with T-connection 10 which is threaded at 12 for insertion into the tap 14 of the casing 16 formed with a central bore 18. The casing is also tapped at 20 for drain plug, 22.

In the upper portion of the open bore 18, we secure as by cement, a transparent tube 24 drilled at 26 for communication with the atmosphere and having a cap 28.

The casing is ported at 30 above the T-connection 10 and has therein a filter disk 32 and screen 34 secured by the threaded end 36 of the tube or pipe 38 which may connect with a stove or other device to which the fluid may flow by gravity.

When attached as described the fluid in the drums will flow through pipes 8 to the T-connection 10 and into casing 16. Heavy impurities will fall in the bore 18 for subsequent removal.

The fluid will select its own level in the tube 24 and will exhaust the air in the tube through the opening or vent 26 which is located well above the maximum height of the fluid in the drums.

The fluid will move through the filter and screen into pipe 38 and will flow by gravity to the ultimate goal.

Having thus fully described our invention what we claim as new and desire to secure by Letters Patent is:

A fluid level gauge for drums comprising a vertically elongated casing formed with a vertical bore open at its upper end and having its upper portion of enlarged diameter and thereby providing an annular shoulder in the casing about the lower end of the enlarged upper portion of the bore, there being a threaded drain opening leading from the lower end of said casing and communicating with the lower end of the bore, a removable plug screwed into said drain opening, said casing being formed with a threaded inlet opening for reception of a feed pipe spaced downwardly from the shoulder and spaced upwardly from the lower end of the bore, there being at the opposite side of the casing from the inlet opening an outlet opening threaded from its outer end for reception of a delivery pipe and having an inner end of reduced diameter communicating with the lower end of the enlarged upper portion of the bore, a filtering disk fitted into the outlet opening through the outer end thereof and seated against a shoulder about the reduced inner end of the outlet opening, an elongated transparent tube disposed vertically over said casing and having its lower end portion fitting tightly in the enlarged upper end portion of said bore and resting upon the shoulder about the lower end thereof and formed at its lower end with a recess registering with the reduced inner end of the outlet opening, and a cap for the upper end of said tube, there being a side opening in the upper end portion of said tube constituting an air vent adjacent the cap.

CLAUDE A. PICKENS.
WILLIAM D. PICKENS.

REFERENCES CITED

The following references are of record in the file of this patent:

UNITED STATES PATENTS

| Number | Name | Date |
|---|---|---|
| 355,098 | Nelson et al. | Dec. 28, 1886 |
| 1,201,128 | Wirth | Oct. 10, 1916 |
| 1,894,732 | Cheney | Jan. 17, 1933 |
| 2,232,250 | Mancini | Feb. 18, 1941 |
| 2,320,913 | Crowell | June 1, 1943 |